US006564181B2

(12) United States Patent
Hardy

(10) Patent No.: US 6,564,181 B2
(45) Date of Patent: *May 13, 2003

(54) METHOD AND SYSTEM FOR MEASUREMENT OF SPEECH DISTORTION FROM SAMPLES OF TELEPHONIC VOICE SIGNALS

(75) Inventor: William C. Hardy, Dallas, TX (US)

(73) Assignee: WorldCom, Inc., Clinton, MS (US)

(*) Notice: Subject to any disclaimer, the term of this patent is extended or adjusted under 35 U.S.C. 154(b) by 72 days.

This patent is subject to a terminal disclaimer.

(21) Appl. No.: 09/840,721

(22) Filed: Apr. 24, 2001

(65) Prior Publication Data

US 2001/0014855 A1 Aug. 16, 2001

Related U.S. Application Data

(63) Continuation of application No. 09/313,823, filed on May 18, 1999, now Pat. No. 6,246,978.

(51) Int. Cl.$^{7}$ ................................................ G10L 15/10

(52) U.S. Cl. ....................................... 704/201; 704/236

(58) Field of Search ................................ 704/201, 200, 704/231, 276, 270, 203, 206, 230, 216, 217, 226, 227, 228, 238, 236

(56) References Cited

U.S. PATENT DOCUMENTS

| | | | | | |
|---|---|---|---|---|---|
| 4,630,304 | A | | 12/1986 | Borth et al. | 381/317 |
| 5,307,441 | A | * | 4/1994 | Tzeng | 704/222 |
| 5,327,521 | A | * | 7/1994 | Savic et al. | 704/200 |
| 5,448,624 | A | * | 9/1995 | Hardy et al. | 379/67 |
| 5,450,522 | A | * | 9/1995 | Hermansky et al. | 704/211 |
| 5,602,959 | A | * | 2/1997 | Bergstrom et al. | 704/203 |
| 5,664,055 | A | * | 9/1997 | Kroon | 704/208 |
| 5,682,463 | A | * | 10/1997 | Allen et al. | 704/230 |
| 5,699,479 | A | * | 12/1997 | Allen et al. | 704/205 |
| 5,778,335 | A | * | 7/1998 | Ubale et al. | 704/219 |
| 5,794,186 | A | * | 8/1998 | Bergstrom et al. | 704/219 |
| 5,940,792 | A | | 8/1999 | Hollier | 704/228 |
| 5,943,647 | A | * | 8/1999 | Ranta | 704/251 |
| 6,018,303 | A | * | 1/2000 | Sadeh | 341/51 |
| 6,278,970 | B1 | * | 8/2001 | Milner | 704/203 |

OTHER PUBLICATIONS

IC Conference Proceedings., 19996 IEEE INternational Conference on Acoustics, Speech and Signal Processing. Chiyi et al., "Vector Quantization Techniques for Output–Based Objective Speech Quality"pp. 491–494 vol. 1. May 1996.*

IC Conference Proceedings, 1996 IEEE International Conference on Acoustics, Speech and Signal Processing. Chiyi et al., "Vector Quantization Techniques for Output–Based Objective Speech Qaulity".

International Conference on Acoustics, Speech and Signal Processing, 1989. Bergtrom et al., "Codebook driven glottal pulse analysis" May 1989.

* cited by examiner

*Primary Examiner*—Richemond Dorvill

(57) ABSTRACT

A system that provides measurements of speech distortion that correspond closely to user perceptions of speech distortion is disclosed. The system calculates and analyzes first and second discrete derivatives to detect and determine the incidence of change in the voice waveform that would not have been made by human articulation because natural voice signals change at a limited rate. Statistical analysis is performed of both the first and second discrete derivatives to detect speech distortion by looking at the distribution of the signals. For example. the kurtosis of the signals is analyzed as well as the number of times these values exceed a predetermined threshold, Additionally. the number of times the first derivative data is less than a predetermined low value is analyzed to provide a level of speech distortion and clipping of the signal due to lost data packets.

19 Claims, 5 Drawing Sheets

METHOD AND SYSTEM FOR MEASUREMENT OF SPEECH DISTORTION FROM SAMPLES OF TELEPHONIC VOICE SIGNALS

This application is a continuation of U.S. patent application Ser. No. 09/313,823 entitled "Method and System for Measurement of Speech Distortion from Samples of Telephonic Voice Signals" filed on May 18, 1999, which is hereby incorporated by reference in its entirety issued as U.S. Pat. No. 6,246,978.

BACKGROUND OF THE INVENTION

1. Field of Invention

The present invention relates generally to telephony and, more particularly, to measuring the level of speech distortion in transmitted voice waveforms.

2. Discussion of the Related Art

When viewed from the perspective of the user of a telephone, the quality of a voice telephone connection depends in very large part on how the speaker's voice on the other end of the call sounds to the listener. In particular, it is well known that users will base their assessment of the quality of each call on what might be called clarity, as determined by at least four independent characteristics:

(1) Volume of the received voice signal, which will determine whether the user will find the speech to be too loud or too soft;

(2) Noise on the line, such as static, popping, and crackle, which will determine whether the listener will have difficulty separating the speech from background noise:

(3) Echo on the line, which will determine whether speakers will be distracted by hearing their own voice echoed back to them as they are talking; and (4) Speech distortion, caused by conditions on the telephone connection that will make the distant speaker sound "tinny," or "raspy," or otherwise distort the voice in ways that cannot be duplicated in natural, face-to-face conversation.

Of these four characteristics, the first three have been present in telephone networks from the beginning. The fourth, speech distortion, however, has only occurred with the advent of modern digital telephone networks. The reason why this occurs in digital telephone networks is that nearly all of the possible causes of perceptible speech distortion over telephone connections stein from malfunctions in the analog-to-digital (A/D) and digital-to-analog (D/A) conversions, or in the transport of digitally encoded voice signals. Speech distortion from these sources are caused, for example, by overdriving of the A/D converter. which produces "clipping" of the waveform that makes speech sound mechanical, encoding that produces high levels of "quantizing" noise that makes speech sound "raspy," and malfunctions or high bit error rates in the digital transport, which results in analog waveforms at the distant end of a connection that could not possibly be produced by the human voice.

Because of the competition for customers that has emerged with the demise of the single-provider monopolies in global telephony, the quality of telephone services in general, and the question of clarity of calls, in particular, have become major concerns in marketing telephone services. Such concerns have, in turn, created ever-increasing demands for capabilities to monitor, and maintain the clarity of, telephone services to ensure that users will remain satisfied with the service they are purchasing.

Various techniques have been developed for monitoring and evaluating the factors that affect clarity of transmitted voice telephone signals. For example, techniques have been developed for refining test capabilities, establishing standards and providing models for collecting and interpreting samples of objectively measurable characteristics of telephone connections such as loss, noise, slope distortion, signal fidelity and echo path loss and delay. Further, techniques have been developed for non-intrusive monitoring which enables the collection of data from live conversation without intruding on, or illegally listening to, live telephone conversations, and thereby obtain measurements of speech power, line noise and echo path loss and delay.

Such telephone measurement techniques and technologies, together with various interpretation models have enabled the development of practices for timely detection and correction of adverse effects relating to low volume, noise and echo characteristics. Additionally, these measurement techniques have provided standards for the design of new telephone systems as well as standards for management of systems that has increased the clarity with regard to three of the clarity factors, i.e., noise, low volume and echo.

However, it would also be desirable to provide a system which is capable of processing data from live telephone conversations to measure speech distortion created in voice signals transmitted by modern digital and/or packet switched voice networks. Various techniques have been used in an attempt to measure speech distortion in digitally mastered waveforms and pseudo speech signals to predict user perception of speech distortion under various conditions. For example, a technique known as PAMS, that was developed in the United Kingdom, uses a recording of digitally mastered phonemes. According to this process, the digitally mastered phonemes are transmitted over a telephone system and recorded at the receiving end. The recorded signal is processed and compared to the originally transmitted signal to provide a measurement of the level of distortion of the transmitted signal.

Other commonly used methods of measuring distortion in audio signals have included the introduction of a sinusoidal waveform at the input of the audio signal and an analysis of the output of the audio channel to detect harmonics and other components that were not part of the original signal. This methodology, however, has certain limitations. Chief among these limitations is that the method provides no basis for assessing the user perception of speech distortion. Essentially, what this means is that there is no means for correlating what happens to individual frequencies with the overall effect of those distortions on user perception.

Further, each of these techniques are only effective when known signals are transmitted. The PAMS technique requires the transmission of a special signal containing special phonemes and a comparison of the transmitted signal with the received signal. The second technique requires transmission of sinusoidal waveforms on the audio channel. It would therefore be advantageous to provide a system that would allow measurement and interpretation of speech distortion that uses samples of natural speech from live telephone conversations and does not require the introduction of special signals or comparison with an original signal. It would also be advantageous to be able to sample such signals in a non-intrusive monitoring situation that enables collection of data from live conversations.

SUMMARY OF THE INVENTION

The present invention overcomes the disadvantages and limitations of the prior art by providing an apparatus and method that allows non-intrusive sampling of live telephone calls and processing of data from those calls to provide a measurement of the level of speech distortion of voice signals.

The present invention discloses a method of processing samples of natural speech signals to produce a measure of distortion that correlates with user perception of voice distortion. The method of processing natural speech signals is based on the creation of numerical amplitude files, representing the amplitude of the speech waveform sampled at fixed, short time intervals, and calculating therefrom consecutive differences to produce first and second discrete derivatives, which approximate the first and second continuous derivatives of the speech waveform. The present invention may therefore comprise generating a set of the discrete second derivatives from a sample of speech taken from a live telephone conversation, and analyzing the second discrete derivatives to produce the measure of distortion.

In accordance with one aspect, the present invention is directed to a method of processing samples of natural speech signals to produce a measure of distortion that correlates with user perception of voice distortion. The method comprises generating a set of discrete second derivatives of the sample and analyzing the set of discrete second derivatives to produce the measure of distortion.

In accordance with another aspect, the present invention is directed to a method of processing samples of natural speech signals to produce a measure of distortion that correlates with user perception of voice distortion. The method comprises generating a set of discrete first derivatives of the samples and analyzing the set of discrete first derivatives to produce the measure of distortion.

In accordance with another aspect, the present invention is directed to a method of calculating a measurement of a level of speech distortion in a natural speech signal. The method comprises generating a numerical amplitude data file representing the amplitude of the natural speech signal sampled at fixed, short time intervals, deriving a set of discrete second derivative data from the numerical amplitude data that approximates a second derivative of the numerical amplitude data with respect to time, and analyzing the discrete second derivative data to generate a value indicative of the likelihood a user will deem speech to be distorted.

In accordance with another aspect, the present invention is directed to a method of calculating a measurement of a level of speech distortion in a natural speech signal. The method comprises generating a numerical amplitude data file representing the amplitude of the natural speech signal sampled at fixed, short time intervals, deriving a set of discrete first derivative data from the numerical amplitude data that approximates a first derivative of the numerical amplitude data with respect to time, and analyzing the discrete first derivative data to generate a value indicative of the likelihood a user will deem speech to be distorted.

In accordance with another aspect, the present invention is directed to a method of calculating the amount of distortion of a natural speech signal. The method comprises sampling the natural voice signal to generate a sampled natural voice signal, digitizing the sampled natural voice signal to produce a digitized signal, encoding the digitized signal to produce a numerical amplitude data file, analyzing the numerical amplitude data tile to determine speech boundary points, selecting speech numerical amplitude data that is included within the speech boundary points of the numerical amplitude data file to produce a numerical speech data file, generating a set of first difference data by determining the difference between successive data points of two numerical speech data files, generating a set of second difference data by determining the difference between successive data points of the set of first difference data, statistically analyzing the first difference data and the second difference data, and generating indicators of speech distortion based on the statistical analysis of the first difference data and the second difference data.

In accordance with another aspect the present invention is directed to an apparatus for measuring distortion of an audio signal. The apparatus comprises a storage medium that stores numerically encoded representations of contiguous samples of the audio signal, and a processor that generates a set of second difference numbers that approximate a second derivative of the audio signal and that analyzes the set of second difference numbers to generate the distortion measurement.

In accordance with another aspect the present invention is directed to an apparatus for measuring distortion of an audio signal. The apparatus comprises a storage medium that stores numerically encoded representations of contiguous samples of the audio signals, and a processor that generates a set of first difference numbers that approximate a first derivative of the audio signal and that analyzes the set of first difference numbers to generate the distortion measurement.

In accordance with another aspect the present invention is directed to a system for measuring of speech distortion of voice signals transmitted over a telephone system. The system comprises a tap connected to the signal telephone that provides samples of the voice signals that are transmitted over the telephone system, a storage medium that stores numerically encoded representations of the samples, and a processor that generates a set of discrete second derivatives of the numerically encoded representations and that analyze the set of discrete second derivatives to produce the distortion measurement.

The advantages of the present invention are that it provides a way to use empirical data from actual live telephone conversations and process that data to obtain measurements of speech distortion. This analysis may be performed without the necessity of comparing the original signal with the received signal. Hence, these measurements may be made on real signals during actual telephone conversations. Additionally, the present invention may process the data, if desired, in a near real-time fashion to provide immediate measurements of speech distortion in a transmitted signal. The present invention may be used to analyze any type of audio signal to detect distortion based upon objective factors that are obtained by analyzing the signal. This may be accomplished through a non-intrusive coupling technique that collects and analyzes data samples from actual transmitted voice signals. Further, this process may be easily automated and the process complements the loss/noise/echo measurements so that an accurate measurement of overall quality may be provided that directly corresponds to user perception of quality.

Various ways of analyzing the data are disclosed including, the measurement of kurtosis of the distribution of second derivative data, the occurrence of first derivative data and second derivative data values over a predetermined threshold, the occurrence of first derivative data under a predetermined threshold, the kurtosis of the first derivative data, and any combination of these techniques. Further, any other desired techniques may be used. For example, the existence of third or fourth derivative data may further indicate the existence of unnatural sounds in the voice signal that could not have been naturally created and are the result of clipping, saturation of A/D and D/A converters, and problems with other components in the system.

The present invention is based, at least in part, on the concept that human vocal cords have a predetermined length and elasticity and accelerate within predetermined limits. Generation and analysis of various levels of derivatives of the speech signal provides a basis for detecting and determining the incidence of unnatural sounds that could not have been produced by a human voice. Further, the distribution of first discrete derivatives may be analyzed to detect clipping of the voice signal since clipping produces a higher than expected incidence of first discrete derivatives having a value of zero, or nearly zero.

DETAILED DESCRIPTION OF THE PREFERRED EMBODIMENT OF THE INVENTION

The present invention is directed to a method of processing samples of natural speech signals to produce a measure of distortion that correlates with user perception of voice distortion. The method of processing natural speech signals is based on the creation of numerical amplitude files, representing the amplitude of the speech waveform sampled at fixed, short time intervals, and calculating therefrom consecutive differences to produce first and second discrete derivatives, which approximate the first and second continuous derivatives of the speech waveform. The information thus obtained may be utilized in a number of ways including the measurement of kurtosis of the distribution of the second derivative data, the occurrence of the first derivative data and second derivative data values over a predetermined threshold, the occurrence of first derivative data under a predetermined threshold, the kurtosis of the first derivative data, and any combination of these techniques.

Figure 1:
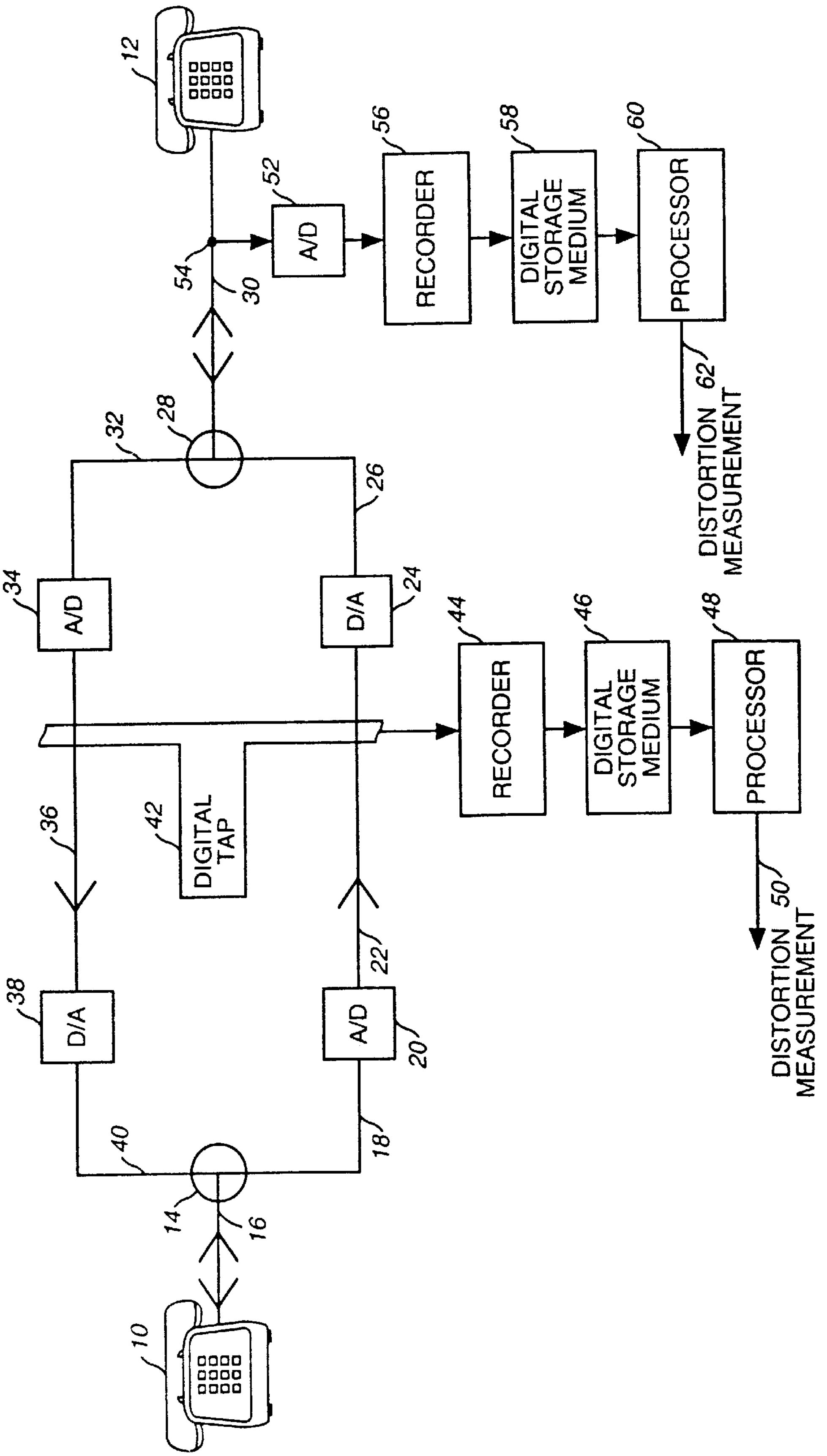
FIG. 1 is schematic block diagram illustrating the manner in which the present invention may be implemented.

FIG. 1 is a schematic block diagram of a common telephone connection system in which a first telephone 10 is connected to a second telephone 12. Telephone 10 is connected to a hybrid 14 via a connector 16 that carries the analog signal from the telephone 10. As is known, hybrids are utilized to maintain full duplex operation in the telephone system. The analog signal from the telephone 10 is transmitted via connector 18 to an analog to digital converter (A/D converter) 20 that converts the analog signal from the telephone 10 to a digital signal. The digital signals are then transmitted along a transmission medium 22. Transmission medium 22 may comprise T-1 lines that are part of the public switched telephone network (PSTN) or they may comprise transmissions via microwave links or satellite connections. The digital signals that are transmitted via medium 22 are received by digital to analog converter (D/A converter) 24 which may be located at another central office the telephone network. The D/A converter 24 converts the digital signals into analog signals that are transmitted via connector 26 to hybrid 28. Hybrid 28 transmits the analog signals that originated at telephone 10 to telephone 12 via connector 30.

FIG. 1 also illustrates the manner in which signals that originate at telephone 12 are transmitted to telephone 10. As shown in FIG. 1, an analog signal is generated by telephone 12 and transmitted via connector 30 to hybrid 28 that separates the analog signal originating from telephone 12, from the analog signal on line 26. The analog signal from telephone 12 is transmitted via connector 32 from hybrid 28 to analog to digital converter (A/D converter) 34. The A/D converter 34 may comprise a portion of the telephone switch of the central office. The A/D converter 34 converts the analog signal from telephone 12 into a digital signal that is transmitted via the transmission medium 36. Again transmission medium 36 may comprise any one of the transmission links disclosed above or any other desired transmission link. The digitized signal from transmission medium 36 is received by a digital to analog converter (D/A converter) 38 that converts the digital signal into an analog signal. This analog signal is transmitted via connector 40 to hybrid 14, which directs the analog signal to telephone 10, via connector 16. In this manner, two way full duplex communication may be provided between telephone 10 and telephone 12 in the standard manner that telecommunications connections are commonly established.

Also shown in FIG. 1 are two methods for non-intrusive acquisition of samples of the transmitted signal. For purposes of the present invention, it is assumed that both sampling devices are located at the receiving end of a signal that is transmitted from telephone 10 to telephone 12. For example, digital tap 42 may be located at the central office to which telephone 12 is connected. Digital tap 42 non-intrusively detects and reproduces the digital signal on both line 22 and line 36 that carry the voice signal over the digital portions of the connections. Any suitable digital tap that is commercially available may be used to implement this portion of the invention. For example, high impedance monitor jacks on channel banks and T-1 circuit transmission equipment may be used. The digital tap 42 acquires contiguous samples of the digital signals on lines 22 and 36 and transmits those digital samples to recorder 44. Recorder 44 stores the digital samples in digital form. Recorder 44 may comprise a desired kind of commercially available device for recording digital signals such as disclosed and taught in U.S. Pat. No. 5,448,624 entitled "Telephone Network Performance Monitoring Method and System" which is specifically incorporated herein by reference for all that it discloses and teaches.

As further shown in FIG. 1, the output of encoder 44 encodes the digital signal that is stored in recorder 44 and transmits the encoded signal to a digital storage medium 46. Essentially, the storage medium 46 stores numerically encoded representations of contiguous samples of the audio signal. For example, the digital signal may be encoded as a binary signal that is stored in digital storage medium 46. Digital storage medium 46 may comprise any desired and commonly available storage medium such as hard disk, any of the various types of RAM, magnetic and optical storage, etc. The digital storage medium 46 records the encoded digital data as numeric amplitude files. The files, for example, may use pulse code modulation (PCM) encoding to represent the numerical amplitude file. PCM encoders produce numerical amplitude files that, for example, range between a value of 8031, which represents the greatest possible value of the amplitude, and −8031 which represents the lowest value of the amplitude of the acoustic voice signal. The fixed time intervals that are used by PCM's are typically 125 microseconds or 250 microseconds. Of course, any desired type of encoding scheme or sampling technique may be used to provide the desired numerical amplitude files for processing in accordance with the present invention. These digital signals are then transmitted to processor 48 which processes the digital information in accordance with the present invention. Processor 48 may comprise any desired logic device including a computer, micro-processor and associated devices for implementing the micro-processor, a state machine, gate array, etc. Processor 48 produces a distortion measurement 50 that indicates the amount of speech distortion of the signals that are transmitted through the system.

As indicated above, with regard to FIG. 1, digital tap 42 may be located at a central office. However, digital tap 42 may also be located at a remote location to tap digital lines, such as T-1 lines, that are directly connected to the remote locations. Also, with the advent of newer technology such as ISDN, xDSL and similar digital transmission protocol, various types of digital signals are being transmitted directly to end users. Also, growing use IP telephony will allow these various types of digital protocols to be used to transmit voice signals directly to the end use location. The present invention may be implemented in any of these environments. The digital tap 42 may be placed in any desired location to detect samples of the digital signal that is transmitted over those lines, including end use locations.

FIG. 1 also illustrates another implementation of the present invention. As shown in FIG. 1, an A/D converter 52 is connected to the analog line 30 via a connector 54. The electrical tap 54 may comprise any commercially available tap including a standard telephone line two-way splitter or other suitable connector. The analog signal is transmitted to an A/D converter 52 that converts the analog signal into a digital signal. TQMS devices may be used to digitize and record the analog voice signals as illustrated by A/D converter 52 and recorder 56. The digital signal is then recorded by recorder 56 that is similar to recorder 44. Recorder 56 also encodes the digital signal for storage in digital storage medium 58 in the same manner as recorder 44. For example, the encoded signal may comprise a binary signal that numerically encodes the amplitude of the digital signal recorded by recorder 56. The digital storage medium then transmits the numerically encoded data to processor 60 for processing in accordance with the present invention. Processor 60 may comprise any desired logic device for processing the numerical amplitude files, as disclosed above, to produce the distortion measurement 62.

Figure 2:
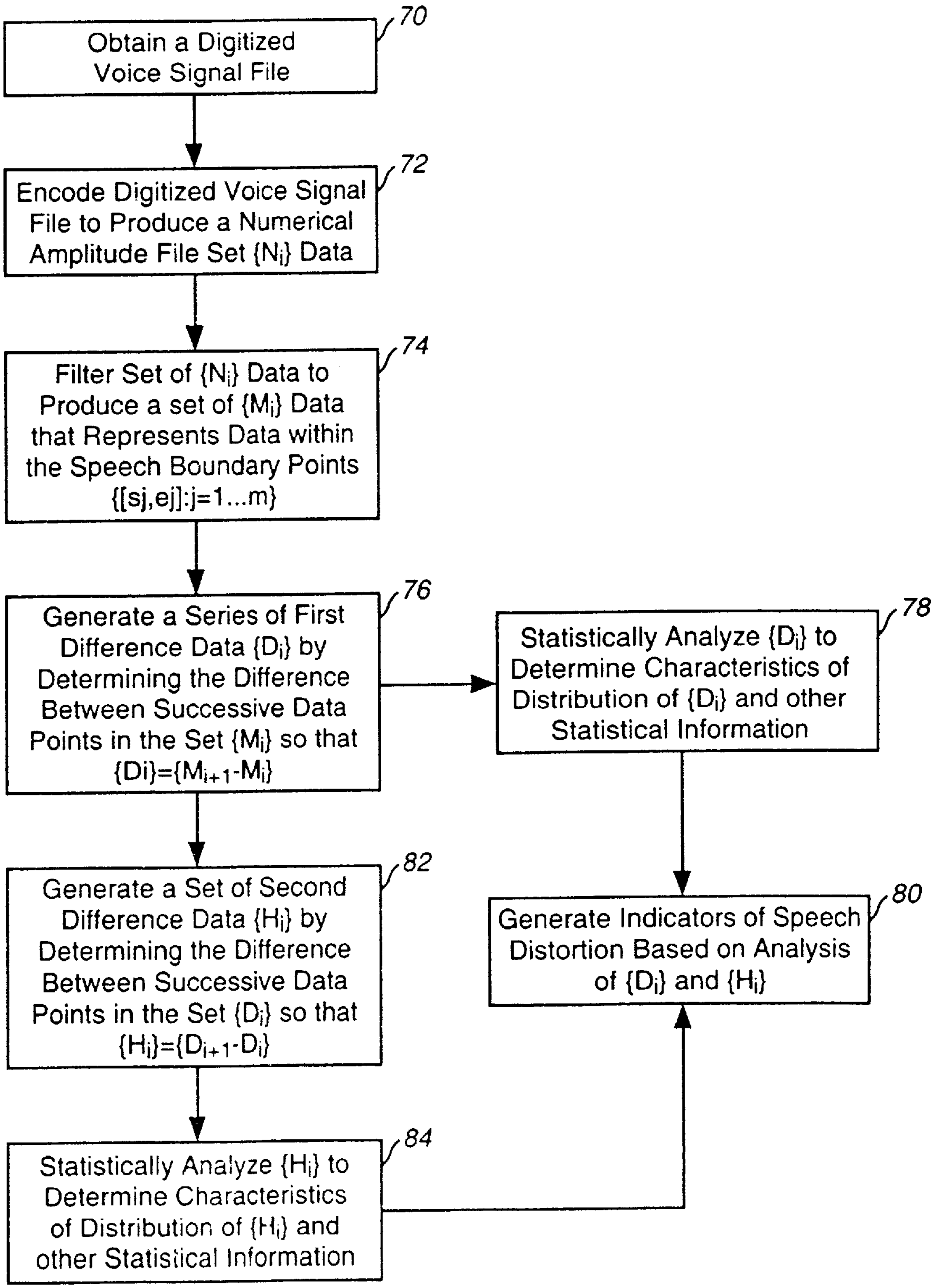
FIG. 2 is a general flow diagram illustrating the basic steps of the present invention.

FIG. 2 is a schematic flow diagram that illustrates the basic operation of the block diagram illustrated in FIG. 1. As shown in FIG. 2. a digitized voice file is obtained at step 70 and recorded, if needed, at step 70. The digitized voice signal file is then encoded to produce a numerical amplitude file which comprises a set of $\{N_i\}$ data. The numerical data file comprises a series of numbers, each of which represents the relevant amplitude of the recorded digitized voice signal samples that arc produced by the A/D converter 52. The numerical amplitude file that is stored in the digital storage medium 46 or digital storage medium 58 may be said to represent an image of the recorded voice waveforms since the numerical amplitude file represents the relevant amplitude of the recorded signals as a function of equally spaced time intervals.

The set of $\{N_i\}$ data includes an ordered collection of N numbers given by $$\{N_i{:}0<i<(n+1)\},$$

where i is an index in the set of $\{N_i\}$. This encoding step is shown as step 72 in FIG. 2. Also shown in FIG. 2, the set $\{N_i\}$ data is filtered to provide a set of $\{M_i\}$ data that represents samples that include only data that was collected while speech was present in the signal. Filtering may be accomplished in various ways to separate and extract the data during the speech intervals. For example, such filtering may be readily accomplished by excluding data which has an amplitude which is less than 6db above the average noise level of the circuit that is being monitored. The filtered data set $\{M_i\}$ that is obtained comprises a collection of ordered numbers $$\{M_i{:}\ a<i<b,\ c<i<d,\ e<i<f,\ \ldots\},$$

wherein each of the pairs (a,b), (c,d), (e,f), . . . are boundaries of intervals for data that was captured for the signal when someone was talking. Each pair of starting and ending points of the speech intervals that is represented by the pairs (a,b), (c,d), . . . may be generically represented as a series of intervals $$\{[s_j, e_j]{:}\ j=1,2,3\ \ldots\ k\},$$

where j is the index of the speech boundary interval and s and e represent the starting and ending points of that interval, respectively. This filtering process takes place at step 74 as shown in FIG. 2.

At step 76 of FIG. 2, a series of difference data $\{D_i\}$ is generated by subtracting the difference between successive data points in the set of $\{M_i\}$ data. In other words, $$\{D_i\}=\{M_{i+1}-M_i\}.$$

Because of the very short time interval between successive amplitude values, the set $\{D_i\}$ of differences approximate the first derivative with respect to time of the continuous speech waveform, multiplied by the time interval between successive samples. The set of difference data $\{D_i\}$ thus captures statistics describing how fast the amplitude in the continuous voice waveform changes. The differences are referred to here as first-discrete derivatives. The series of $\{D_i\}$ data is then statistically analyzed at step 78 to determine characteristics of the distribution of $\{D_i\}$ data and other statistical information, as further described below. Statistical information is then used to generate indicators of speech distortion based on the $\{D_i\}$ data at step 80.

It is also shown in FIG. 2, at step 82, the set of $\{D_i\}$ data is used to generate a set of second difference data $\{H_i\}$. The set of $\{H_i\}$ data is generated by determining the difference between successive data points in the set of $\{D_i\}$ data such that $$\{H_i\}=\{D_{i+1}-D_i\}.$$

The values in the $\{H_i\}$ data set are similarly representative of the second derivative with respect to time of the continuous speech waveform from which the $\{M_i\}$ amplitude samples are taken, closely approximating the second derivative of the continuous waveform, multiplied by the time interval between successive samples. The set of difference data $\{H_i\}$ thus captures statistics describing how fast the driver of changes in the amplitude of the continuous voice waveform is changing. Since the human vocal chords have length and elasticity which strongly limit how fast the amplitude of natural speech can change with time (represented by the $\{D_i\}$ data) and how fast the vocal chords can accelerate changes in amplitude (represented by the $\{H_i\}$ data), these sets may be analyzed to determine the incidence of changes in amplitude that could not have been caused by human articulation. After the $\{H_i\}$ data set is statistically analyzed at step 84, indicators of speech distortion are generated at step 80 based on the analysis of the $\{H_i\}$ data set or some combination of the $\{D_i\}$ data set and $\{H_i\}$ data set, as well as other levels of derivatives of the $\{M_i\}$ data set.

Figure 3:
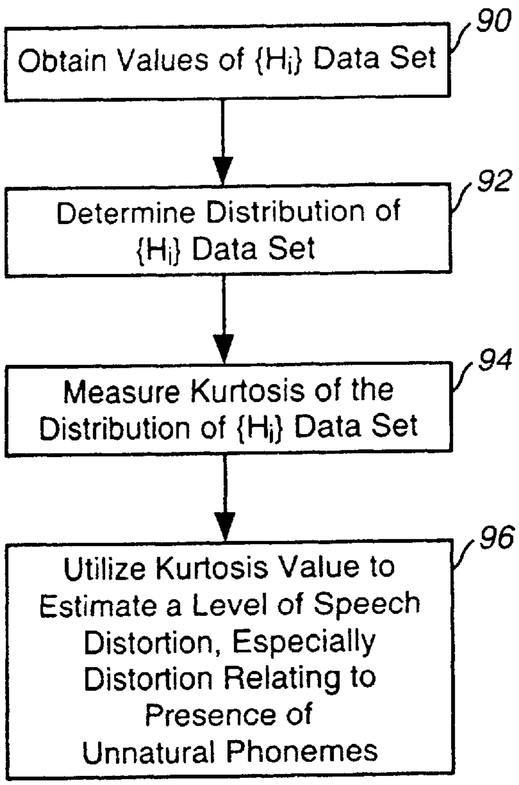
FIG. 3 is a flow diagram illustrating one exemplary method of analyzing data in accordance with the present invention.

FIGS. 3 through 7 comprise flow diagrams that illustrate various ways of statistically analyzing both the $\{D_i\}$ data set and the $\{H_i\}$ data set. FIG. 3 is flow diagram that illustrates one exemplary method of analyzing the $\{H_i\}$ data set. At step 90 the values of the $\{H_i\}$ data set are obtained as indicated in block 82 of FIG. 2. At step 92 of FIG. 3, the distribution of the $\{H_i\}$ data set is determined. For example, the $\{H_i\}$ data may be analyzed by determining the proportion of $\{H_i\}$ values that lie between certain values, selected to characterize particular conditions, such as an absolute value for second discrete derivatives that is too great to have been generated by a human voice. Alternately, statistics of the $\{H_i\}$ may be used as the basis for characterizing the overall $\{H_i\}$ sample. For example, the kurtosis of the $\{H_i\}$, defined in terms of the second and fourth moments about the mean, would measure the tendency for those numbers to cluster around their mean, showing thereby whether the voice sample exhibited the very tight clustering of values around the mean expected of a set of numbers generated with constraints on the amount of variation in their values.

At step 96 of FIG. 3, the value of the kurtosis of the $\{H_i\}$ sample is used as an indicator of the extent to which the observed distribution of discrete second derivatives deviates from the distribution expected for natural voice, and the extent of that deviation is used to determine the likelihood that users will perceive changes in the amplitude of the speech waveform that could not have been articulated by human voice. In this case, the lower the kurtosis, the more likely it will be that a user will find the speech heard on the telephone to be distorted.

Figure 4:
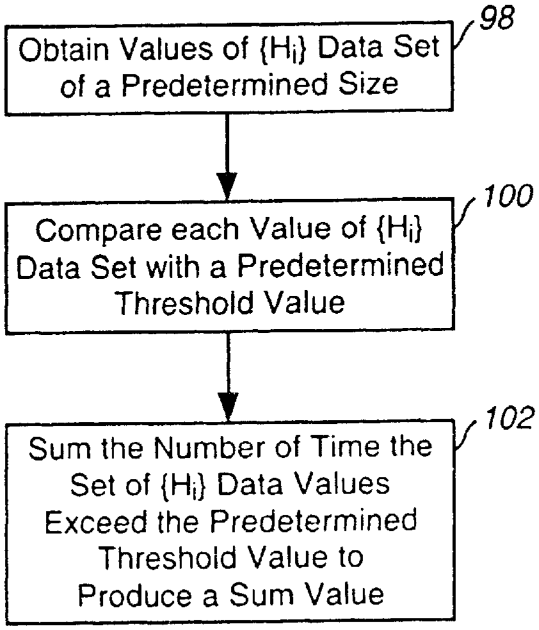
FIG. 4 is flow diagram illustrating another exemplary method of analyzing data in accordance with the present invention.

FIG. 4 is a schematic block diagram of another exemplary technique for statistically analyzing the second derivative $\{H_i\}$ data set. At step 98, the value of the $\{H_i\}$ data is obtained, as indicated at step 82 of FIG. 2. This data set may be of a predetermined size, if desired, so that the absolute values of results of the analysis performed in accordance with FIG. 4 provide information as to distortion levels. Additionally, the data $\{H_i\}$ may he readily accumulated in real-time, and the associated measures of speech distortion may be continuously calculated over a moving window to provide real-time results. For example, at step 100 of FIG. 4, each element of the $\{H_i\}$ data set is compared with a threshold value as the data are generated to maintain a running count of the number of times the threshold is exceeded. Then, the proportion of such threshold violations may be computed on a running basis to determine the likely extent to which telephone users would perceive speech distortion on the call sampled. Other ways of analyzing the second derivative data are certainly within the purview of the present invention including the use of several predetermined threshold values, or any other means for detecting the number of high amplitude second derivative data points and the distribution of those data points.

Figure 5:
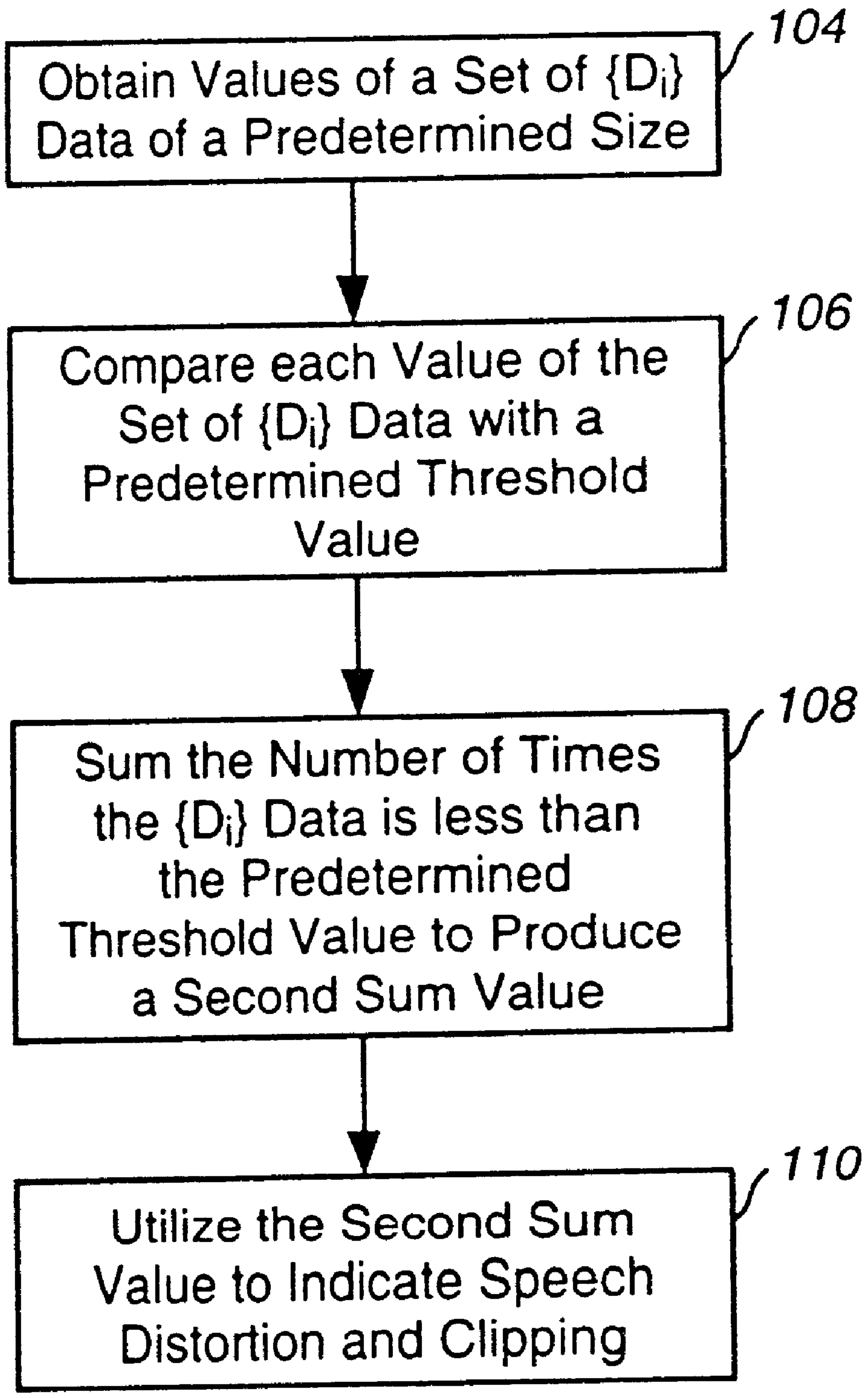
FIG. 5 is a flow diagram illustrating another exemplary method of analyzing data in accordance with the present invention.

FIG. 5 is schematic diagram of another exemplary method of statistically analyzing the $\{D_i\}$ set of data such as illustrated at step 78 of FIG. 2. At step 104 of FIG. 5, the values of the first derivative $\{D_i\}$ data set are obtained as indicated at step 76 of FIG. 2. At step 106 of FIG. 5, each data point of the $\{D_i\}$ data set is compared to a predetermined lower threshold for the absolute value of $\{D_i\}$. At step 108 of FIG. 5, the incidences of the $\{D_i\}$ data set that are less than the predetermined values are added together to produce a sum value that is indicative of the number of times that the $\{D_i\}$ data set values do not exceed this very low threshold value. This information is then used at step 110 to indicate speech distortion and clipping. In physical terms, the amplitude of the acoustic tone of the voice signals is constantly changing. A zero value indicates that the amplitude of the speech signal is not changing, and therefore indicates maximum amplitude clipping by the A/D encoder or loss of data packets transmitted over a packet-switched transport medium. Either problem may be manifested as speech distortion.

Figure 6:
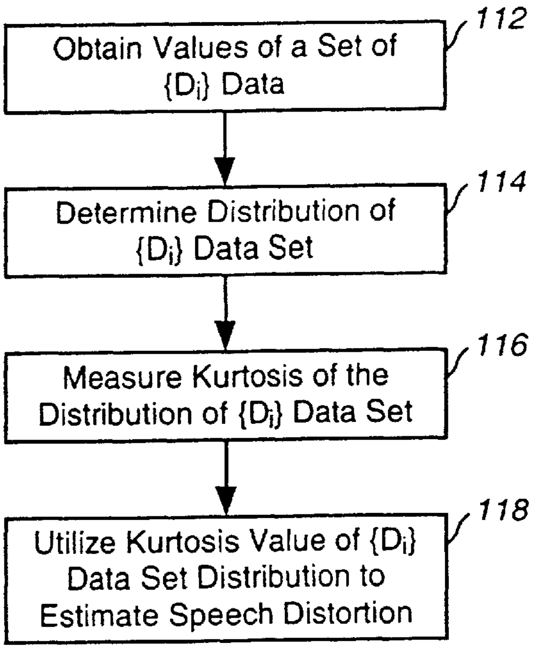
FIG. 6 is a flow diagram illustrating another exemplary method of analyzing data in accordance with the present invention.

FIG. 6 is a schematic block diagram of an exemplary method of statistically analyzing the $\{D_i\}$ data set such as schematically illustrated in step 78 of FIG. 2. As shown in FIG. 6., at step 112 the values are obtained for the $\{D_i\}$ data set in the manner illustrated at step 76 of FIG. 2. At step 114 of FIG. 6, the distribution of the $\{D_i\}$ data set is determined. Again, this can be done by generating histograms based upon the occurrence of $\{D_i\}$ data having certain values. At step 116, the kurtosis of the $\{D_i\}$ data set is calculated. At step 118 the kurtosis is compared to reference values to determine likely user perception of speech distortion.

Figure 7:
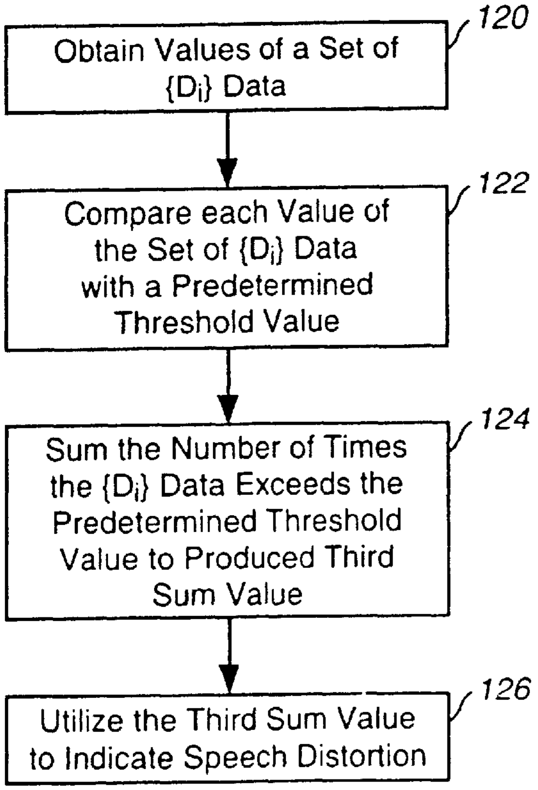
FIG. 7 is a flow diagram illustrating another exemplary method of analyzing data in accordance with the present invention.

FIG. 7 is a flow diagram of another method of analyzing the $\{D_i\}$ data set in accordance with step 78 of FIG. 2. As shown in FIG. 7, the values of the $\{D_i\}$ data are obtained at step 120 that corresponds to step 76 of FIG. 2. At step 122 of FIG. 7, the $\{D_i\}$ data is compared with a predetermined threshold of value. At step 124, the number of times that the $\{D_i\}$ data set exceeds the predetermined threshold value is added together to produce a sum value. The sum value is then utilized at step 126 to indicate speech distortion. In physical terms, the amount of times that the first derivative data exceeds some redetermined threshold, that is set a level above the normal level at which first derivative data is normally detected for voice signals, provides an indication of the level of speech distortion of the voice signal. In this manner, the sum value for a fixed $\{D_i\}$ data set provides an absolute indication of certain types of speech distortion.

The present invention therefore provides a unique way to analyze samples of actual voice data to provide an indication of speech distortion that is perceived by an actual listener. This technique is a single ended process in which the nature of the originally transmitted voice signal is not required to perform a comparison analysis. The amount of speech distortion may be calculated or measured by analyzing the detected data, which may be sampled in a non-intrusive manner in accordance with the present invention. Various techniques of analyzing various levels of derivatives of the data are used that indicate distortion of phonemes that could not occur in a natural manner, but rather, occurred due to saturation of system components, loss of data packets, and other similar types of problems that may occur in the digitization and transmission of a voice signal.

The foregoing description of the invention has been presented for purposes of illustration and description. It is not intended to be exhaustive or to limit the invention to the precise form disclosed, and other modifications and variations may be possible in light of the above teachings. The embodiments disclosed were chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of processing natural speech signals to produce a measure of distortion that correlates with user perception of voice distortion, the method comprising:

digitizing the natural speech signals;

generating a set of discrete second derivatives of the digitized natural speech signals; and analyzing the set of discrete second derivatives.

2. The method of claim 1, wherein the step of analyzing the set of discrete second derivatives is based on evaluation of the value of the kurtosis of the distribution of values of the discrete second derivatives.

3. A method of processing samples of natural speech signals to produce a measure of distortion that correlates with user perception of voice distortion, the method comprising:

generating a set of discrete second derivatives of the samples;

analyzing the set of discrete second derivatives; and generating indicators of speech distortion based on said analysis.

4. The method of claim 3 wherein the step of analyzing the set of discrete second derivatives is based on evaluation of the value of the kurtosis of the distribution of values of the discrete second derivatives.

5. A method of processing natural speech signals to produce a measure of distortion that correlates with user perception of voice distortion, the method comprising:

digitizing the natural speech signals;

generating a set of discrete first derivatives of the digitized natural speech signals; and analyzing the set of discrete first derivatives.

6. The method of claim 5 wherein the step of analyzing the set of discrete first derivatives further comprises determining the incidences of nearly zero and zero values of the discrete first derivatives to indicate clipping of the natural speech signals.

7. A method of processing samples of natural speech signals to produce a measure of distortion that correlates with user perception of voice distortion, the method comprising:

generating a set of discrete first derivatives of the samples;

analyzing the set of discrete first derivatives; and generating indicators of speech distortion based on said analysis.

8. The method of claim 7 wherein the step of analyzing the set of discrete first derivatives further comprises determining the incidences of nearly zero and zero values of the discrete first derivatives to indicate clipping of the natural speech signals.

9. A method of calculating a measurement of a level of speech distortion in a natural speech signal, the method comprising:

generating a numerical amplitude data file representing the amplitude of the natural speech signal sample at fixed, short time intervals;

deriving a set of discrete second derivative data from the numerical amplitude data that approximates a second derivative of the numerical amplitude data with respect to time;

analyzing the discrete second derivative data; and generating a value, based on said analysis, indicative of the likelihood a user will perceive the natural speech signal to be distorted.

10. The method of claim 9 wherein the step of analyzing further comprises analyzing a value of kurtosis of a distribution of the second derivative data by amplitude.

11. The method of claim 9 wherein the step of analyzing further comprises analyzing tails of a distribution of the second derivative data by amplitude.

12. A method of calculating a measurement of a level of speech distortion in a natural speech signal, the method comprising:

sampling said natural speech signal;

generating a numerical amplitude data file representing the amplitude of the natural speech signal sample at fixed, short time intervals;

deriving a set of discrete second derivative data from the numerical amplitude data that approximates a second derivative of the numerical amplitude data with respect to time; and analyzing the discrete second derivative data to generate a value indicative of the likelihood a user will perceive the natural speech signal to be distorted.

13. A method of calculating a measurement of a level of speech distortion in a natural speech signal, the method comprising:

sampling said natural speech signal;

generating a numerical amplitude data file representing the amplitude of the natural speech signal sample at fixed, short time intervals;

deriving a set of discrete first derivative data from the numerical amplitude data that approximates a first derivative of the numerical amplitude data with respect to time;

analyzing the discrete first derivative data to generate a value indicative of the likelihood a user will perceive the natural speech signal to be distorted.

14. A method of calculating a measurement of a level of speech distortion in a natural speech signal, the method comprising:

generating a numerical amplitude data file representing the amplitude of the natural speech signal sample at fixed, short time intervals;

deriving a set of discrete first derivative data from the numerical amplitude data that approximates a first derivative of the numerical amplitude data with respect to time;

analyzing the discrete first derivative data; and generating a value, based on said analysis, indicative of the likelihood a user will perceive the natural speech signal to be distorted.

15. An apparatus for measuring distortion of an audio signal comprising:

a storage medium that receives and stores encoded representatives of the audio signal;

a processor that generates a set of second difference numbers that approximate a second derivative of the audio signal and that analyzes the set of second difference numbers to generate indicators of a distortion measurement for the audio signal.

16. An apparatus for measuring distortion of an audio signal comprising:

a storage medium that receives and stores encoded representatives of the audio signal; and a processor that generates a set of first difference numbers that approximate a first derivative of the audio signal and that analyzes the set of first difference numbers to generate indicators of a distortion measurement for the audio signal.

17. A method of processing samples of natural speech signals, the method comprising:

generating a set of discrete second derivatives of the samples; and analyzing the set of discrete second derivatives to produce a measure of distortion that correlates with user perception of voice distortion for the natural speech signals.

18. The method of claim 17, wherein said measure of speech distortion is used to alter the natural speech signals in a communications system.

19. The method of claim 17, wherein said measure of speech distortion is produced based upon live voice communications.

* * * * *